United States Patent
Neubauer et al.

(10) Patent No.: US 12,308,488 B2
(45) Date of Patent: May 20, 2025

(54) FUEL CELL SYSTEM

(71) Applicant: AVL List GmbH, Graz (AT)

(72) Inventors: Raphael Neubauer, Graz (AT); Nikolaus Soukup, Hamburg (DE); Matthias Lerch, Graz (AT); Robert Pöschl, Judendorf-Strassengel (AT); Julian Makinson, Graz (AT)

(73) Assignee: AVL List GmbH, Graz (AT)

( * ) Notice: Subject to any disclaimer, the term of this patent is extended or adjusted under 35 U.S.C. 154(b) by 324 days.

(21) Appl. No.: 17/776,253

(22) PCT Filed: Dec. 9, 2020

(86) PCT No.: PCT/AT2020/060438
§ 371 (c)(1),
(2) Date: May 12, 2022

(87) PCT Pub. No.: WO2021/113888
PCT Pub. Date: Jun. 17, 2021

(65) Prior Publication Data
US 2022/0393191 A1    Dec. 8, 2022

(30) Foreign Application Priority Data
Dec. 9, 2019   (AT) .............................. A 51078/2019

(51) Int. Cl.
*H01M 8/04*    (2016.01)
*F28D 7/16*    (2006.01)
(Continued)

(52) U.S. Cl.
CPC ...... *H01M 8/04014* (2013.01); *F28D 7/1607* (2013.01); *H01M 8/04074* (2013.01);
(Continued)

(58) Field of Classification Search
CPC ..................... H01M 8/04014; H01M 8/04074
See application file for complete search history.

(56) References Cited

U.S. PATENT DOCUMENTS

2006/0099471 A1*   5/2006   Ichikawa .......... H01M 8/04097
                                                                429/434
2011/0294028 A1*  12/2011   Hannesen ........... H01M 8/2484
                                                                429/455

FOREIGN PATENT DOCUMENTS

| DE | 102011078115 | 12/2012 |
| DE | 102013225368 | 4/2022 |
| WO | WO 2012/105300 | 8/2012 |

OTHER PUBLICATIONS

Roetzel et al. "C2 Waermeuebertrager: Waermedurchgang und Waermedurchgangskoeffizienten", VDI-Waermeatlas, :79-97, 2019, No English Abstract.

(Continued)

*Primary Examiner* — Olatunji A Godo

(57) ABSTRACT

The invention relates to a fuel cell system (10) comprising at least one fuel cell stack (11) having an anode section (12) and a cathode section (13), an ejector (14), a fuel mixture line (15) for conveying a fuel mixture—containing primary fuel and secondary fuel—from the ejector (14) to the anode section (12), a primary fuel line (16) for supplying the primary fuel to the ejector (14), and a recirculation line (17) for returning the secondary fuel from the anode section (16) to the ejector (14), wherein at least sections of the primary fuel line (16) extend through a heat exchange volume (18) within the recirculation line (17) for a heat-transmitting connection between the secondary fuel and the primary fuel.

10 Claims, 7 Drawing Sheets

(51) Int. Cl.
　　　*H01M 8/04007*　　(2016.01)
　　　*H01M 8/04014*　　(2016.01)
　　　*H01M 8/04089*　　(2016.01)
　　　*H01M 8/12*　　　　(2016.01)
(52) U.S. Cl.
　　　CPC ... *H01M 8/04097* (2013.01); *F28F 2250/106* (2013.01); *H01M 2008/1293* (2013.01)

(56)　　　　References Cited

OTHER PUBLICATIONS

TurbuFlex "Increase Energy Efficiency—TurbuFlexS", Datasheet, Schreder Abgastechnologie: 8P, 2019.
International Search Report and the Written Opinion Dated Feb. 24, 2021 From the International Searching Authority Re. Application No. PCT/AT2020/060438 and Its Translation of Search Report Into English. (11 Pages).

* cited by examiner

FUEL CELL SYSTEM

RELATED APPLICATIONS

This application is a National Phase of PCT Patent Application No. PCT/AT2020/060438 having International filing date of Dec. 9, 2020, which claims the benefit of priority of Austria Patent Application No. A51078/2019 filed on Dec. 9, 2019. The contents of the above applications are all incorporated by reference as if fully set forth herein in their entirety.

FIELD AND BACKGROUND OF THE INVENTION

The present invention relates to a fuel cell system comprising at least one fuel cell stack, having an anode section and a cathode section, an ejector, a fuel mixture line for conveying a fuel mixture containing primary fuel and secondary fuel from the ejector to the anode section, a primary fuel line for supplying the primary fuel to the ejector and a recirculation line for returning the secondary fuel from the anode section to the ejector.

In fuel cell systems of this generic type it is known for fuel in the form of a primary fuel to be conveyed in the direction of the anode section by means of an ejector. The ejector allows hot anode exhaust gas to be recirculated by, i.e. passed out of the anode section in the form of secondary fuel into the ejector and from there fed back to the anode section together with the primary fuel. A high pressure of the primary flow is advantageous in order to achieve the highest possible recirculation rates. Furthermore, the primary fuel should if possible be preheated when fed to the anode section. To this end, the German patent application DE 41 37 968 A1 for example discloses a fuel cell system with heat exchange devices for heat decoupling from a high-temperature fuel cell, wherein the decoupled heat is used to preheat a fuel of the high-temperature fuel cell and to preheat air. In addition, there should be as little pressure loss as possible in the anode path, i.e. inter alia in a primary fuel line for supplying the primary fuel.

The object of the present invention is to take into account, at least partially, the problems described above. In particular, it is an object of the present invention to create a correspondingly improved fuel cell system in which the primary fuel can be effectively preheated with as constant and high a pressure as possible.

The above object is achieved by the patent claims.

SUMMARY OF THE INVENTION

In particular, the above object is achieved through the fuel cell system according to claim 1. Further advantages of the invention are disclosed in the dependent claims, the description and the drawings.

According to a first aspect of the present invention, a fuel cell system is provided. The fuel cell system has at least one fuel cell stack with an anode section and a cathode section, an ejector, a fuel mixture line for conveying a fuel mixture containing primary fuel and secondary fuel from the ejector to the anode section, a primary fuel line for supplying the primary fuel to the ejector and a recirculation line for returning the secondary fuel from the anode section to the ejector. At least sections of the primary fuel line extend through a heat exchange volume within the recirculation line for a heat-transmitting connection between the secondary fuel and the primary fuel.

In the region within which the primary fuel line extends within the recirculation line and/or through the heat exchange volume, the primary fuel line and the recirculation line are in each case preferably of tubular design, wherein the tubular form does not necessarily need to have a circular inner and/or outer diameter, but can also have an at least partially angular and/or only partially round cross-section. Due to the primary fuel line extending through the heat exchange volume of the recirculation line, the desired heating-up of the primary fuel can be realised simply and effectively. An effective heat transfer from the heated, recirculated secondary fuel to the primary fuel which is to be heated can be effected via the wall of the primary fuel line.

By conveying the primary fuel through the primary fuel line within the recirculation line, the primary fuel can also be heated up at relatively high pressure, i.e. the primary fuel and/or a corresponding primary fuel flow can be efficiently preheated, with high pressure, in a small installation space, by means of the arrangement according to the invention, whereby more complex installation spaces within the fuel cell system can also be used.

Depending on the desired pressure, the diameter and/or the wall thickness of the primary fuel line can be designed accordingly, at least in a region within the heat exchange volume. A pressure loss in a recirculation flow of the secondary fuel can nonetheless be minimised and/or kept small.

In the present case, the recirculation line can be configured not only to return the anode exhaust gas to the ejector but also to return the cathode exhaust gas to at least one functional component of the fuel cell system. The heat exchange volume is therefore not limited to a volume in which only anode exhaust gas is conveyed. Rather, cathode exhaust gas and/or an anode exhaust gas/cathode exhaust gas mixture can also be conveyed therein. The crucial point is that exhaust gas is conveyed which is at least temporarily hotter than the primary fuel, so that the desired positive heat transfer from the heat exchange volume to the primary fuel line and from there to the primary fuel carried therein can be made possible.

The geometry of the primary fuel line and/or the recirculation line can be designed differently depending on the fuel cell system used and/or the desired requirements without needing to change the concept and/or the design of the fuel cell system significantly. This means that the solution according to the invention can be adapted in a particularly flexible way to the respective needs and geometric specifications in the fuel cell system.

The ejector can be designed in the form of a jet pump in which a pumping effect is generated by a primary fuel jet which sucks in, accelerates, compresses and/or transports the secondary fluid by momentum exchange. Since such a pump type is relatively simple in structure and has no, or hardly any, moving parts, it is particularly robust, low-maintenance and versatile in use. The ejector can be a nozzle, a suction section, a mixing chamber and/or can have a mixing section and a diffuser, whereby the functional components are preferably arranged in succession downstream in the above order. In the suction section, the secondary fuel can be sucked in by the primary fuel and transported into the mixing chamber. Accordingly, a slight intermixing between the primary fuel and the secondary fuel already takes place in the suction section, although the actual and/or main intermixing takes place in the mixing section.

The primary fuel line preferably extends at least over a length within the heat exchange volume which corresponds to a multiple of a diameter of the primary fuel line within the heat exchange volume. In particular, the fact that the primary fuel line extends through the heat exchange volume is to be understood to the effect that a substantial part of the primary fuel line extends through the heat exchange volume and not, for example, only a small part which only projects slightly into a heat exchange volume and as a result does not allow a heat exchange connection, or only allows an insignificant heat exchange connection between the primary fuel and the secondary fuel.

The heat exchange volume is, in particular, to be understood to mean an internal volume of the recirculation line and/or a volume within the recirculation line in a region of the recirculation line in which the primary fuel line extends through the heat exchange volume within the recirculation line. The fuel cell system is preferably configured in the form of an SOFC system in which a reformer can be arranged downstream of the ejector and upstream of the anode section.

The primary fuel and/or the secondary fuel can in particular be understood to mean a hydrogen- and/or hydrocarbon-containing fluid, whereby the hydrogen and/or hydrocarbon content in the primary fuel is preferably greater than in the secondary fuel.

According to a further embodiment of the present invention it is possible that, in a fuel cell system, the primary fuel line within the heat exchange volume is, at least in sections, meander-formed and/or curved. This makes it possible, due to the available heat exchange volume within the recirculation line and/or its length, to create a relatively large surface area for the desired heat transfer from the secondary fuel to the primary fuel.

It can be of particular advantage if the primary fuel line within the heat exchange volume is, at least in sections, spiral-formed. This meander-formed, three-dimensional primary fuel line section can create a large heat exchange surface, while at the same time a relatively low-resistance fluid channel for the primary fuel can be made possible. The meander form can also be understood to mean a wave form. The meander form can be of uniform or irregular configuration. That is to say the curve radii and/or diameters of the bends need not be identical to one another. For example, it is also possible that the primary fuel line within the heat exchange volume is, at least in sections, meander-formed and intertwined, in a plane and/or in three-dimensional space. This too makes it possible to create a relatively large primary fuel line surface within the heat exchange volume for the desired heat-transmitting connection between the secondary fuel and the primary fuel.

It is also possible that, in a fuel cell system according to the invention, the primary fuel line has a first primary fuel conveying section and a second primary fuel conveying section, wherein the first primary fuel conveying section and the second primary fuel conveying section are design to carry and/or convey the primary fuel within the at least two primary fuel conveying sections within the heat exchange volume. This allows a relatively large surface area of the primary fuel line within the heat exchange volume to be realised, which in turn allows a correspondingly effective heat transfer from the secondary fuel to the primary fuel to be achieved. The first primary fuel conveying section and the second and/or at least one further primary fuel conveying section can be arranged parallel to each other, at least in sections, and/or extend parallel to each other, at least in sections, through the heat exchange volume. Both primary fuel conveying sections can be straight or can be meander-formed, in particular spiral-formed. Particularly advantageously, the first primary fuel conveying section and the second primary fuel conveying section can, at least in sections, each extend through the heat exchange volume in the form of a spiral, in particular in the form of a double helix.

Parallel conveyance can be understood to mean a conveyance and/or guidance of the primary fuel side by side in primary fuel line sections arranged at a distance from each other. The primary fuel line can thus have at least one forked section in which the primary fuel line branches into the first primary fuel conveying section and the second and/or at least one more primary fuel conveying section.

In addition, in a fuel cell system according to the present invention it can be of advantage if the primary fuel line has, at least in a region of the heat exchange volume, a pipe diameter which is multiple times smaller than the recirculation line in this region. This allows the pressure in the primary fuel line to be easily adjusted to a desired value. In addition, the flow resistance in the recirculation line can be kept low. In extensive experimental tests conducted in connection with the present invention it has proved to be particularly advantageous with regard to the aspects mentioned above if, at least in the region in which the primary fuel line extends, for example at least in sections coaxially, through the heat exchange volume of a tubular recirculation line, the diameter of a tubular primary fuel line has a value within a range of between 5% and 25% of the diameter of the tubular recirculation line.

According to a further design variant of the present invention it is possible that, in a fuel cell system, the primary fuel line within the heat exchange volume has a counterflow section for conveying the primary fuel in a counterflow direction that is opposite or substantially opposite to a flow direction of the secondary fuel in the heat exchange volume. That is to say, the primary fuel line, for example in the form of a pipe coil or spiral, can be arranged in a countercurrent to the exhaust gas flow, in particular to the secondary fuel flow. This has the advantage that the heat transfer surface area formed by the wall of the primary fuel line always reaches the hot secondary fuel flow. According to the invention, the counterflow section can, at least in sections, be spiral-formed.

This results in an enlarged heat transfer surface area and a correspondingly effective heat exchange between the secondary fuel and the primary fuel. In the counterflow section, the spiral form of the primary fuel line can narrow or widen in the counterflow direction, i.e. in a direction opposite to a secondary fuel flow direction. That is to say, the successive turns of the spiral form can have a smaller or larger radius of curvature and/or diameter. In other words, an amplitude in the countercurrent direction of the spiral form, which appears wave-formed when viewed in a side view, can become smaller or larger from curve to curve and/or from wave to wave in the countercurrent direction, at least over a partial section of the primary fuel line.

In a fuel cell system according to the present invention, the ejector can have a nozzle, wherein the primary fuel line within the heat exchange volume, or at least in sections within the heat exchange volume, extends up to the nozzle. This allows the pressure in the primary fuel line and/or the pressure of the primary fuel to be kept high, as desired, up to the nozzle.

In a fuel cell system according to the invention, it can also be advantageous if the recirculation line has a recirculation line wall in which a first inlet opening through which the primary fuel line enters the heat exchange volume, an outlet opening through which the primary fuel line emerges again from the heat exchange volume into the environment of the recirculation line and a second inlet opening through which the primary fuel line re-enters the heat exchange volume are formed. This allows the primary fuel line to be adapted flexibly to different geometries of different fuel cell systems as well as different wishes with regard to the temperature control of the primary fuel by the secondary fuel.

Furthermore, in a fuel cell system according to the present invention, downstream of the outlet opening and upstream of the second inlet opening, the primary fuel line extends along an outer circumferential surface of the recirculation line wall, at least in sections in surface contact with the outer circumferential surface.

That is to say, the primary fuel line can extend along an outer wall of the recirculation line with approximately the inner radius and/or the outer radius of the recirculation line. If the primary fuel line is arranged in a pipe bend section of the recirculation line, a flow resistance in the recirculation line can be kept relatively low, i.e. the pressure loss in the recirculation line can be minimised and/or kept correspondingly low. The primary fuel line is preferably sickle-formed or crescent-formed here, wherein a curved side surface of the primary fuel line is designed in a manner complementary and/or corresponding to a correspondingly curved outer circumferential surface of the recirculation line.

In a fuel cell system according to the present invention, the recirculation line can have a pipe bend section, wherein the primary fuel line extends at least partially through the heat exchange volume in the pipe bend section. This makes it possible to create a relative long heat exchange region for the primary fuel line in which the primary fuel line, in particular where designed in the form of a meander and/or spiral, is and/or can be designed with a relatively large total exterior wall surface area allowing an effective heat transport from the secondary fuel to the primary fuel. The pipe bend section can be understood to mean a section of the recirculation line which curves at least once by at least 30°, in particular by at least 90° and preferably within a range between 170° and 190°.

The fuel cell system according to the invention is in particular at least partially manufactured using additive methods, for example by 3D printing. In particular, at least the heat exchanger volume with the various lines is produced by 3D printing.

BRIEF DESCRIPTION OF THE SEVERAL VIEWS OF THE DRAWINGS

Further measures improving the invention are explained in the following description of different exemplary embodiments of the invention, which are represented schematically in the figures.

In each case schematically.

Elements with the same function and mode of action are in each case given the same reference signs in the figures.

DESCRIPTION OF SPECIFIC EMBODIMENTS OF THE INVENTION

Figure 1:
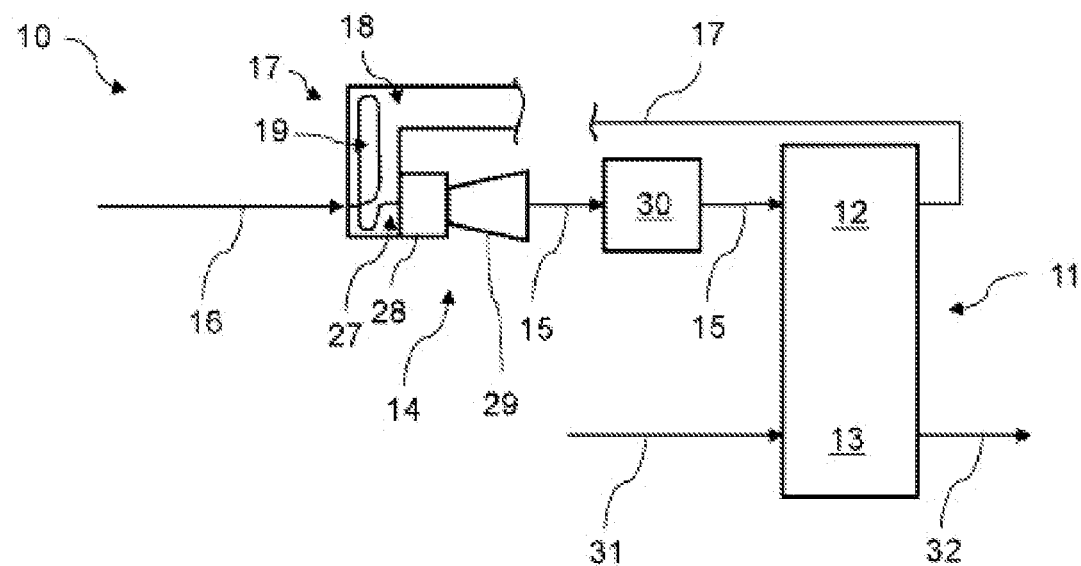
FIG. 1 shows a block diagram describing a fuel cell system according to a preferred embodiment of the present invention.

The ejector 14 shown in FIG. 1 has a suction nozzle section 27, a mixing chamber 28 formed downstream of the suction nozzle section 27 and a diffuser 29 arranged downstream of the mixing chamber 28. A reformer 30 for reforming the fuel mixture from the fuel mixture line 15 for use as an anode gas in the anode section 12 is positioned downstream of the ejector 14 and upstream of the anode section 12. The primary fuel line 16 has a counterflow section 19 within the heat exchange volume 18 of the recirculation line 17.

Figure 2:
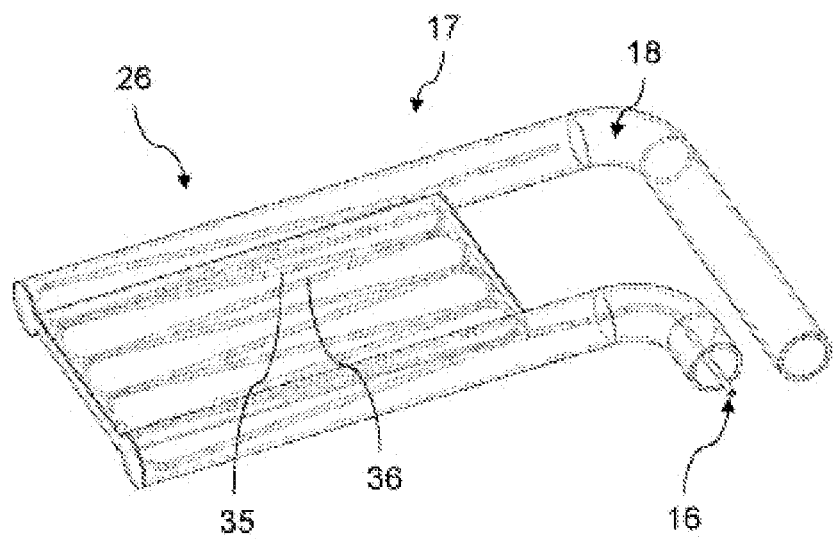
FIG. 2 shows a perspective view of a line arrangement according to a first embodiment of the present invention.

FIG. 2 shows a line arrangement according to a first concrete embodiment. In the line arrangement shown, it can be seen that the primary fuel line 16 within the heat exchange volume 18 is, in sections, curved in a meander form. The primary fuel line 16 shown in FIG. 2 has a first primary fuel conveying section 35 and a second primary fuel conveying section 36, wherein the first primary fuel conveying section 35 and the second primary fuel conveying section 36 are designed to carry the primary fuel in parallel within the at least two primary fuel conveying sections 35, 36 in the heat exchange volume 18. Looking at FIG. 2, it can also be seen that in the region of the heat exchange volume 18 the primary fuel line 16 has a pipe diameter which is multiple times smaller than the recirculation line 17 in this region.

Figure 3:
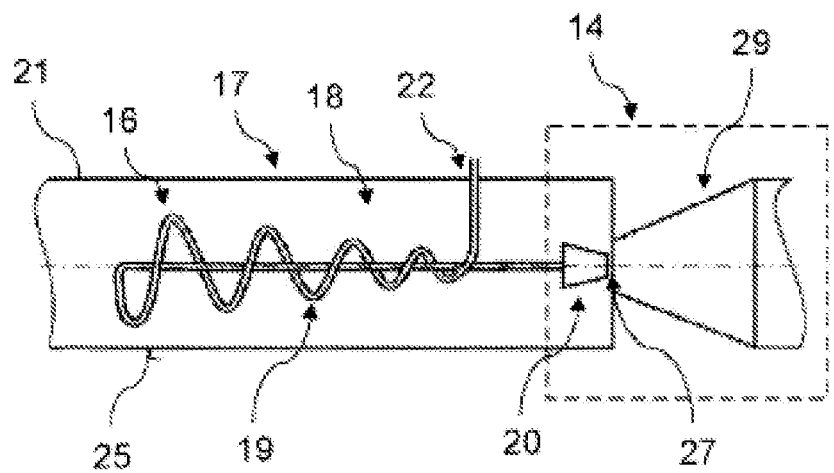
FIG. 3 shows a side view of a line arrangement according to a second embodiment of the present invention.

FIG. 3 shows a side view explaining a line arrangement according to a second embodiment. In the line arrangement shown in FIG. 3, the primary fuel line 16 within the heat exchange volume 18 has a counterflow section 19 for conveying the primary fuel in a counterflow direction that is opposite to a flow direction of the secondary fuel in the heat exchange volume 18. The counterflow section 19 shown in FIG. 3 is substantially spiral-formed, wherein the spiral form and/or the coil diameter of the spiral form becomes continuously enlarged in the countercurrent direction. A section of the primary fuel line 16 following on from the spiral form runs straight in the direction of flow of the secondary fuel, in particular centrally and/or along a central spiral form axis, through the counterflow section 19 and/or the spiral form of the counterflow section 19. According to the second embodiment, the primary fuel line 16, more precisely the section of the primary fuel line 16 following on from the spiral form, extends within the heat exchange volume 18 up to the nozzle 20 of the ejector 14.

Figure 4:
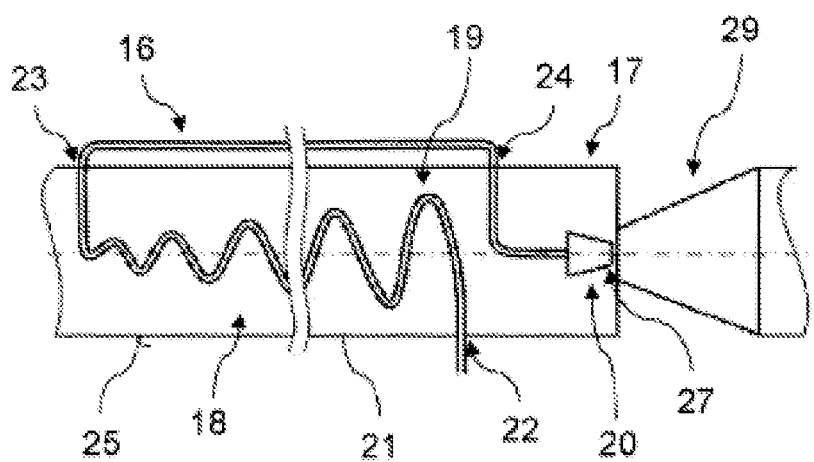
FIG. 4 shows a side view of a line arrangement according to a third embodiment of the present invention.

FIG. 4 shows a line arrangement according to a third embodiment. In the line arrangement shown in FIG. 4, the recirculation line 17 includes a recirculation line wall 21 in which a first inlet opening 22 through which the primary fuel line 16 enters the heat exchange volume 18, an outlet opening 23 through which the primary fuel line 16 emerges again from the heat exchange volume 18 into the environment of the recirculation line 17 and a second inlet opening 24 through which the primary fuel line 16 re-enters the heat exchange volume 18 before the primary fuel line 16 extends within the heat exchange volume 18 up to the nozzle 20 of the ejector 14. In a line section of the primary fuel line 16 between the outlet opening 23 and the second inlet opening 24, the primary fuel line 16 extends substantially straight and parallel to the outer circumferential surface 25 and thus also to the recirculation line wall 21 of the recirculation line 17.

Figure 5:
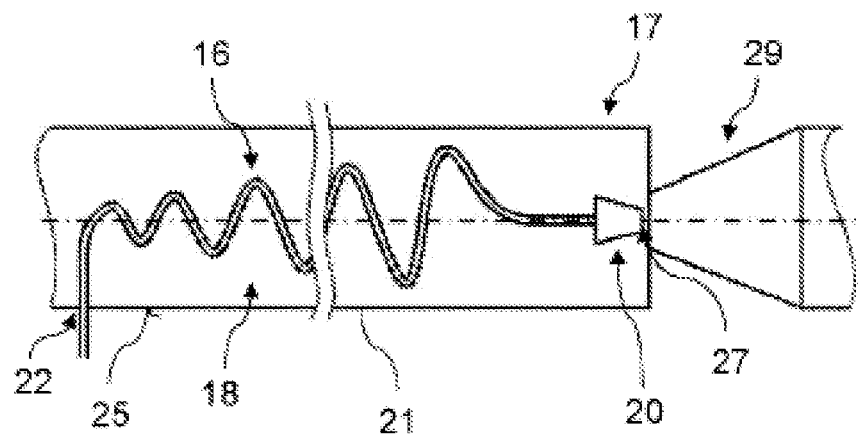
FIG. 5 shows a side view of a line arrangement according to a fourth embodiment of the present invention.
Figure 6:
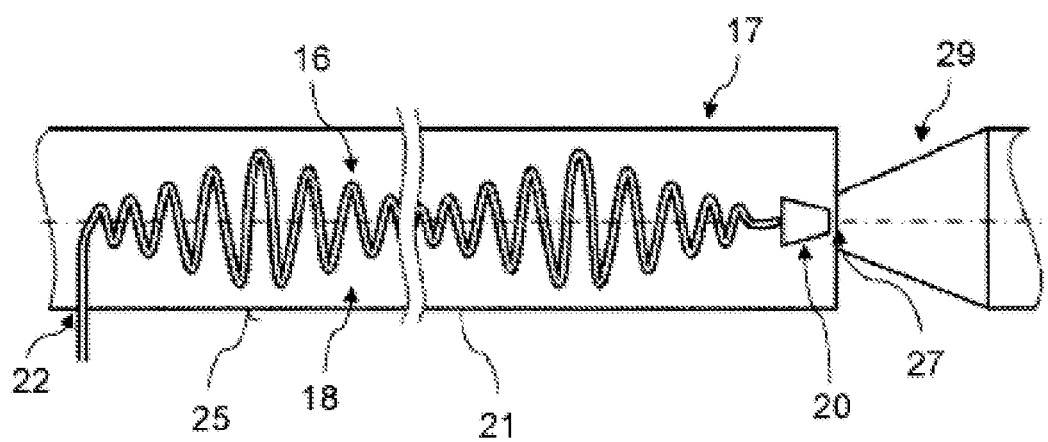
FIG. 6 shows a side view of a line arrangement according to a fifth embodiment of the present invention.

FIG. 5 shows a line arrangement according to a fourth embodiment in which a spiral-formed primary fuel line 16 for conveying the primary fuel in the flow direction of the secondary fuel widens in the same direction. That is to say, the diameter of the spiral form widens in the flow direction of the secondary fuel. In the line arrangement according to a fifth embodiment shown in FIG. 6, the diameter of the spiral form widens and narrows repeatedly in alternating succession in the direction of flow.

Figure 7:
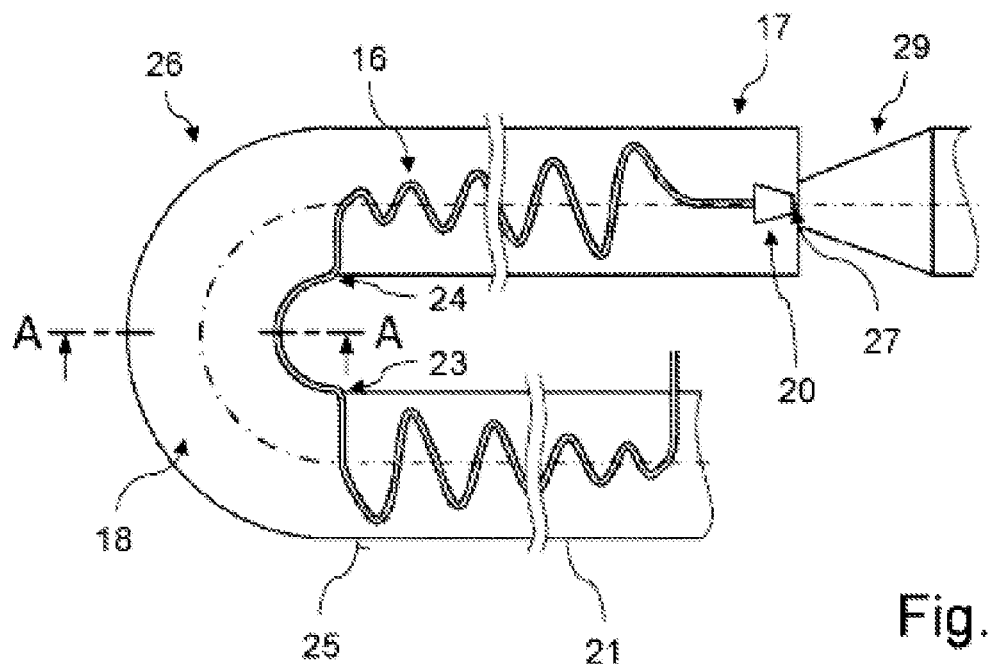
FIG. 7 shows a side view of a line arrangement according to a sixth embodiment of the present invention.
Figure 8:
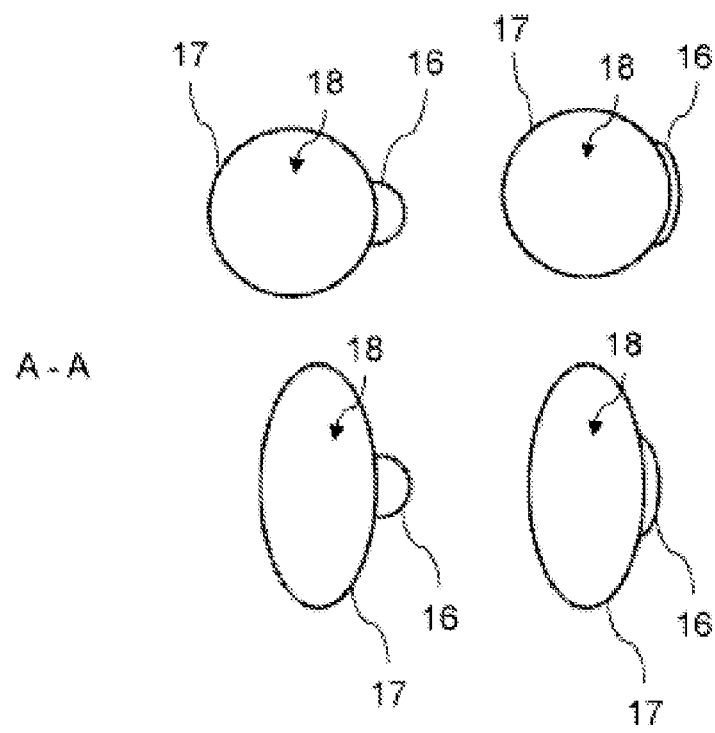
FIG. 8 shows sectional front views according to the sixth embodiment of the present invention with different line geometries of the primary fuel line.

FIG. 7 shows a line arrangement according to a sixth embodiment in which, downstream of the outlet opening 23 and upstream of the second inlet opening 24, the primary fuel line 16 extends in surface contact with the outer circumferential surface 25 of the recirculation line wall 21 along this outer circumferential surface 25. More precisely, the primary fuel line 16 extends by approximately 180° along an inner curved section of the recirculation line 17. FIG. 8 shows different embodiments of the primary fuel line 16 with reference to, but not limited to the example shown in FIG. 7. As can be seen in FIG. 8, in a section in which it extends along the outer circumferential surface 25 of the recirculation line wall 21, the primary fuel line 16 can be sickle-formed, complementary, in sections, to the outer circumferential surface 25 and, accordingly, partially flush-mounted, so that a highly effective heat transport from the hot secondary fuel to the primary fuel which is to be warmed up can also be realised.

Figure 9:
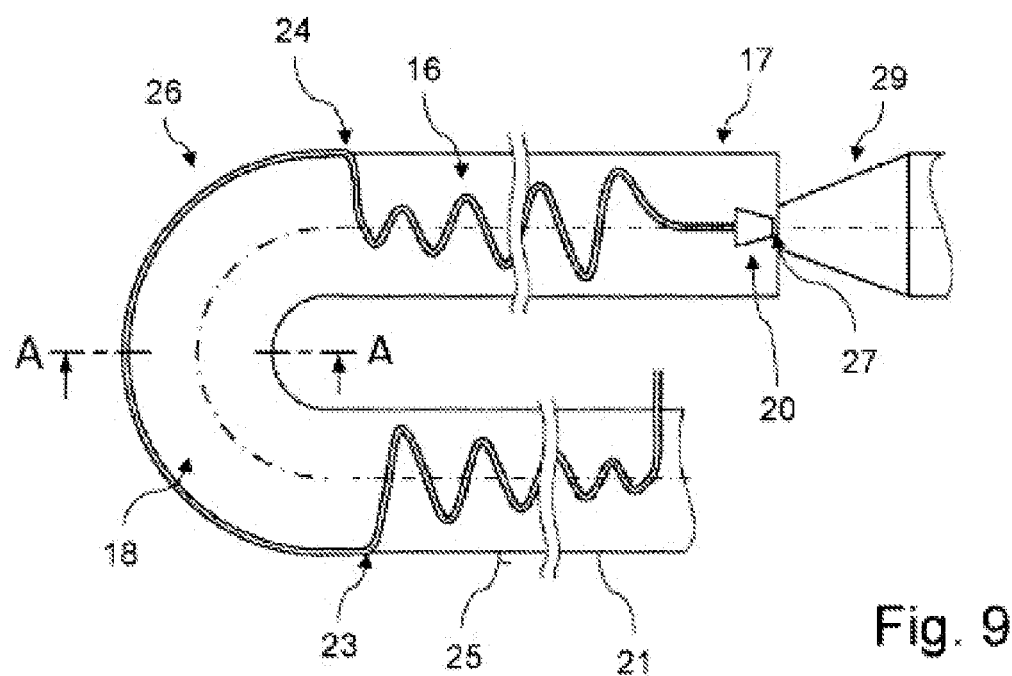
FIG. 9 shows a side view of a line arrangement according to a seventh embodiment of the present invention.
Figure 10:
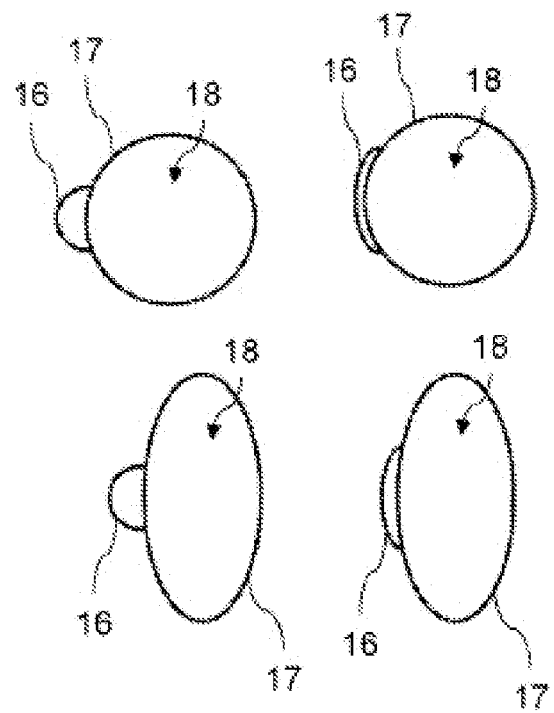
FIG. 10 shows sectional front views according to the seventh embodiment of the present invention with different line geometries of the primary fuel line.

FIG. 9 shows a line arrangement according to a seventh embodiment in which, downstream of the outlet opening 23 and upstream of the second inlet opening 24, the primary fuel line 16 extends by approximately 180° along an outer curved section of the recirculation line 17. FIG. 10 shows different embodiments of the primary fuel line 16 with reference to, but not limited to the example shown in FIG. 9. As can be seen in FIG. 10, in a section in which it extends along the outer circumferential surface 25 of the recirculation line wall 21, the primary fuel line 16 can be sickle-formed, complementary, in sections, to the outer circumferential surface 25 and, accordingly, partially flush-mounted, so that a highly effective heat transport from the hot secondary fuel to the primary fuel which is to be warmed up can also be realised. At this point, it should be noted that a primary fuel line 16 as shown in FIG. 8 and FIG. 10 which is, at least in sections, sickle-formed in cross-section, can also be formed on the recirculation line wall 21 outside of the heat exchange volume 18, partially along the outer circumferential surface 25, in other regions of the recirculation line 17, i.e. not only in a pipe bend section 26 but also in a straight section.

Figure 11:
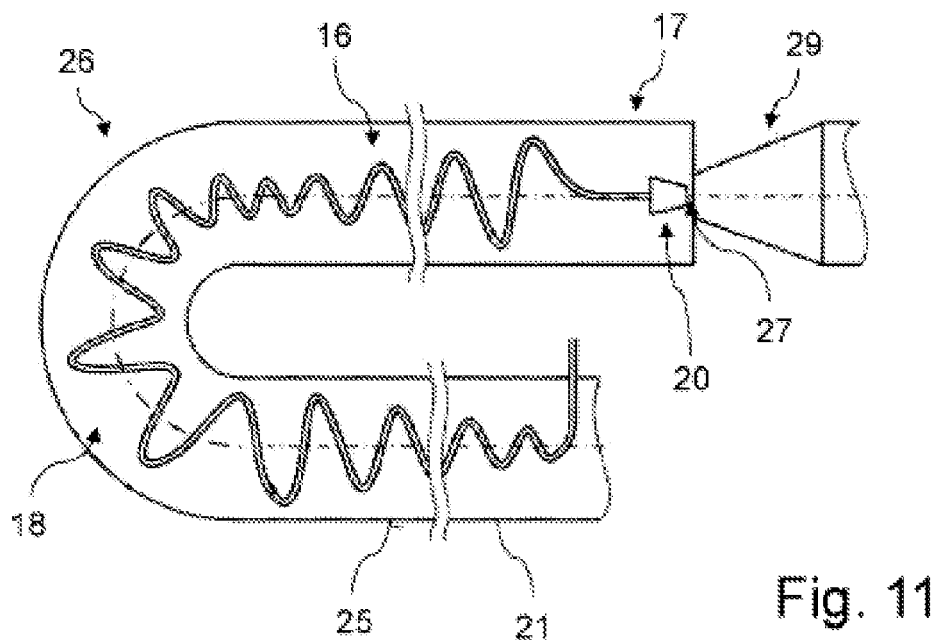
FIG. 11 shows a side view of a line arrangement according to an eighth embodiment of the present invention.
Figure 12:
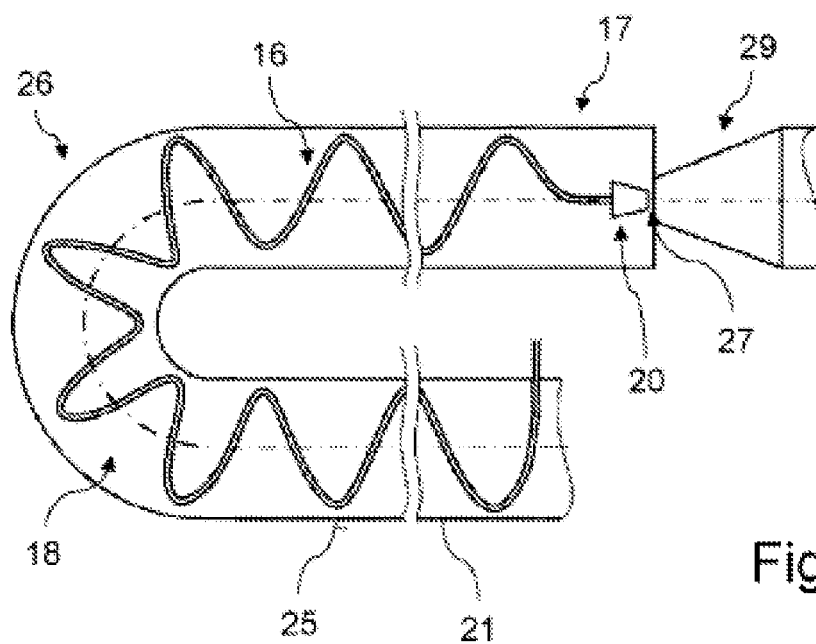
FIG. 12 shows a side view of a line arrangement according to a ninth embodiment of the present invention.

FIG. 11 shows a line arrangement according to an eighth embodiment in which the primary fuel line 16 extends in an irregular spiral form through the heat exchange volume 18 in the pipe bend section 26 up to the nozzle 20. In the line arrangement according to a ninth embodiment shown in FIG. 12, the spiral form has a larger diameter and/or a coil section with a larger diameter, wherein the diameter of the spiral form corresponds approximately to the diameter of the recirculation line. More precisely, the mean diameter of the spiral form amounts to more than 90% of the diameter of the recirculation line 17 and/or of the heat exchange volume 18 enclosed therein.

Figure 13:
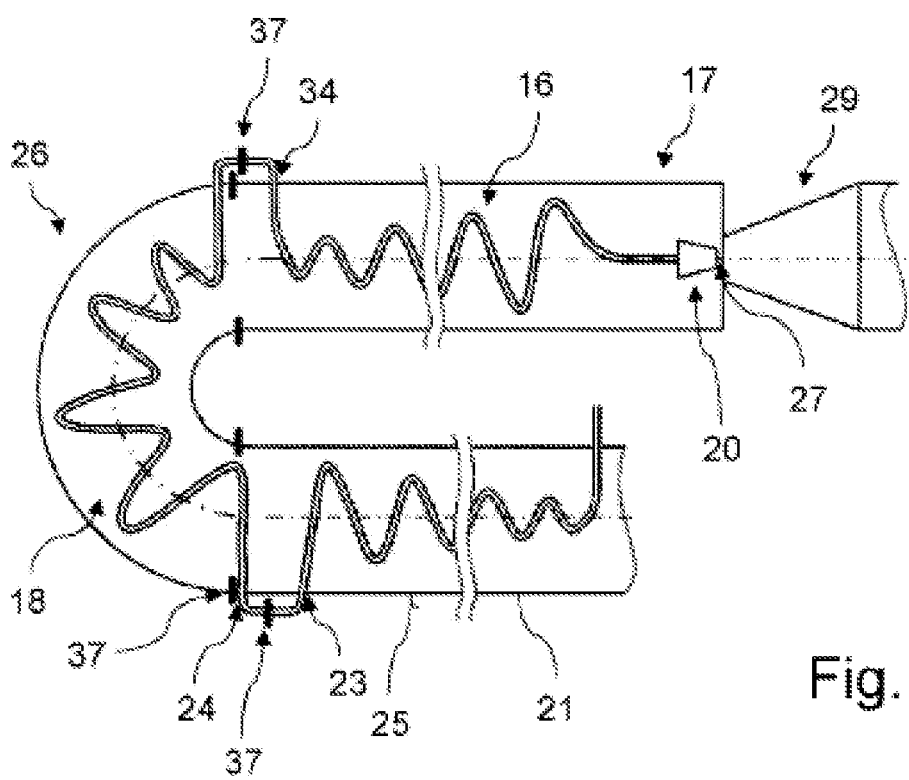
FIG. 13 shows a side view of a line arrangement according to a tenth embodiment of the present invention.

In the line arrangement according to a tenth embodiment shown in FIG. 13, the recirculation line wall 21 has a first inlet opening 22 through which the primary fuel line 16 enters the heat exchange volume 18, an outlet opening 23 through which the primary fuel line 16 emerges again from the heat exchange volume 18 into the environment of the recirculation line 17, a second inlet opening 24 through which the primary fuel line 16 re-enters the heat exchange volume 18, a second outlet opening 33 through which the primary fuel line 16 emerges again from the heat exchange volume 18 into the environment of the recirculation line 17 and a third inlet opening 34 through which the primary fuel line 16 re-enters the heat exchange volume 18. Between the first outlet opening 23 and the second inlet opening 24 and between the second outlet opening 33 and the third inlet opening 34, the line arrangement has connection points 37, according to FIG. 13 in the form of, but not to be regarded as being limited to, welded joints, at which the primary fuel line 16 and the recirculation line 17 are connected, in this case welded together, and/or can be connected together.

In addition to the embodiments described, the invention allows further design principles. That is to say, the invention should not be considered to be limited to the exemplary embodiments explained with reference to the Figures.

LIST OF REFERENCE SIGNS 10 fuel cell system
11 fuel cell stack
12 anode section
13 cathode section
14 ejector
15 fuel mixture line
16 primary fuel line
17 recirculation line
18 heat exchange volume
19 counterflow section
20 nozzle
21 recirculation line wall
22 first inlet opening
23 outlet opening
24 second inlet opening
25 outer circumferential surface
26 pipe bend section
27 suction nozzle section
28 mixing chamber
29 diffusor
30 reformer
31 cathode gas supply line
32 cathode exhaust gas line
33 second outlet opening
34 third inlet opening
35 first primary fuel conveying section
36 second primary fuel conveying section
37 connection point

The invention claimed is:

1. Fuel cell system (10) comprising at least one fuel cell stack (11) having an anode section (12) and a cathode section (13), an ejector (14), a fuel mixture line (15) for conveying a fuel mixture containing primary fuel and secondary fuel from the ejector (14) to the anode section (12), a primary fuel line (16) for supplying the primary fuel to the ejector (14), and a recirculation line (17) for returning the secondary fuel from the anode section (16) to the ejector (14), characterised in that at least sections of the primary fuel line (16) extend through a heat exchange volume (18) within the recirculation line (17) for a heat-transmitting connection between the secondary fuel and the primary fuel upstream of a suction nozzle section (27) via a wall of the primary fuel line (16) prior to intermixing.

2. Fuel cell system (10) according to claim 1, characterised in that the primary fuel line (16) within the heat exchange volume (18) is, at least in sections, meander-formed and/or curved.

3. Fuel cell system (10) according to claim 1, characterised in that the primary fuel line (16) has a first primary fuel conveying section (35) and a second primary fuel conveying section (36), wherein the first primary fuel conveying section (35) and the second primary fuel conveying section (36) are designed to carry the primary fuel in parallel within the at least two primary fuel conveying sections (35, 36) in the heat exchange volume (18).

4. Fuel cell system (10) according to claim 1, characterised in that the primary fuel line (16) has, at least in a region of the heat exchange volume (18), a pipe diameter which is multiple times smaller than the recirculation line (17) in this region.

5. Fuel cell system (10) according to claim 1, characterised in that the primary fuel line (16) within the heat exchange volume (18) has a counterflow section (19) for conveying the primary fuel in a counterflow direction that is opposite or substantially opposite to a flow direction of the secondary fuel in the heat exchange volume (18).

6. Fuel cell system (10) according to claim 5, characterised in that the counterflow section (19) is, at least in sections, spiral-formed.

7. Fuel cell system (10) according to claim 1, characterised in that the ejector (14) has a nozzle (20) and the primary fuel line (16) within the heat exchange volume (18) extends up to the nozzle (20).

8. Fuel cell system (10) according to claim 1, characterised in that the recirculation line (17) has a recirculation line wall (21) in which a first inlet opening (22) through which the primary fuel line (16) enters the heat exchange volume (18), an outlet opening (23) through which the primary fuel line (16) emerges again from the heat exchange volume (18) into the environment of the recirculation line (17) and a second inlet opening (24) through which the primary fuel line (16) re-enters the heat exchange volume (18).

9. Fuel cell system (10) according to claim 8, characterised in that, downstream of the outlet opening (23) and upstream of the second inlet opening (24), the primary fuel line (16) extends, at least in sections in surface contact, along an outer circumferential surface (25) of the recirculation line wall (21).

10. Fuel cell system (10) according to claim 8, characterised in that the recirculation line (17) has a pipe bend section (26) and the primary fuel line (16) extends at least partially through the heat exchange volume (18) in the pipe bend section (26).

\* \* \* \* \*